A. E. SMITH.
Axle for Carriages.

No. 109,681. Patented Nov. 29, 1870.

Witnesses.
Charles L. Barritt
Franklin Barritt.

Inventor.
A. E. Smith

United States Patent Office.

ALFRED E. SMITH, OF BRONXVILLE, NEW YORK.

Letters Patent No. 109,681, dated November 29, 1870.

IMPROVEMENT IN AXLES FOR CARRIAGES.

The Schedule referred to in these Letters Patent and making part of the same.

*To all whom it may concern:*

Be it known that I, ALFRED E. SMITH, of Bronxville, Westchester county, State of New York, have invented certain new and useful Improvements in Axles for Wagons and other Vehicles; and I do hereby declare that the following is a full description of the same.

The object of my invention is to overcome the tendency of the ordinary screw and nut locking the hub and axle when set up tight enough to prevent rattling; also to prevent the nut from running off when backing the wagon, or getting loose, so as to cause the hub to rattle, and, at the same time, making the nut so as to be adjustable on the axle, to compensate for the wearing away of the leather-washers between the nut and axle-box, and thus, by the simple adjustment of the nut, prevent all rattling of the wheel on the axle.

Another object of my invention is to make the end of the spindle the bearing against which the nut draws when set up, instead of making shoulders on the inner end of the screw-nib, as is commonly the case for the screw-nut to draw against, when set up to hold the wheel on the axle; and The nature of my invention consists in forming the screw-nib of the axle with a longitudinal groove in it, and combining therewith a screw-nut having a number of detent pin-holes therein, so that the nut may be detained on the screw-nib at any point desired, and according to the wearing away of the leather-washers or packing applied to the axle to keep the wheel from rattling; and secondly, in forming the screw-nib on the spindle longer than the cavity of the solid-headed screw-nut, so as to make the bottom of the cavity of the screw-nut the bearing for the axle to draw against when the nut is set up, and thus obviate the formation of a shoulder at the junction of the screw-nib with the body of the spindle, and thereby weaken it; but, To describe my invention more particularly, I will refer to the accompanying drawings forming a part of this specification, the same letters of reference, wherever they occur, referring to like parts.

Letter A represents the axle, and B the ordinary metal box for securing it in the hub.

Figure 1:
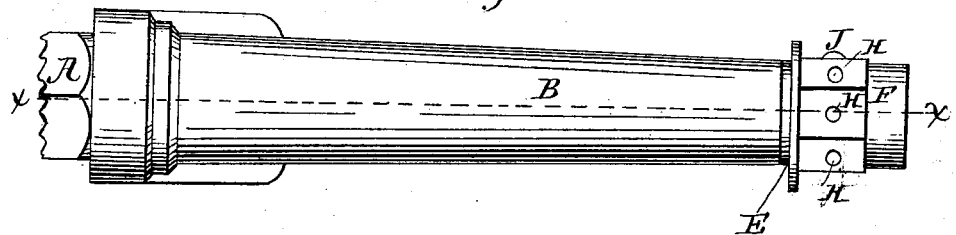
Figure 1 is a side view of the axle and metal box by which it is secured in the hub.
Figure 2:
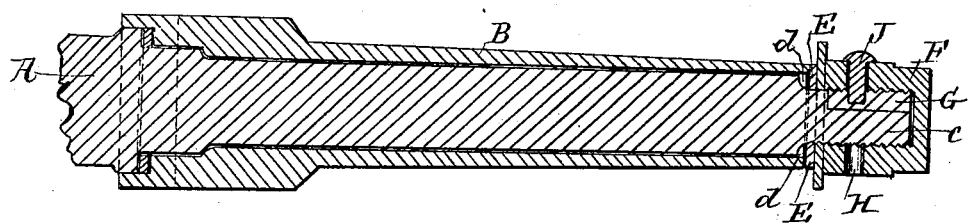
Figure 2 is a longitudinal cut section of same through the line *x x*, fig. 1.
Figure 3:
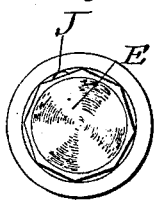
Figure 3 is a detached end view of the screw-nut.
Figure 4:
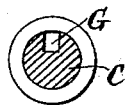
Figure 4 is an end view of the screw-nib, showing the groove therein.

On the end of the axle-spindle is cut a screw-thread, C, the length of which extends within the edges of the metal box B, as shown at *d*, fig. 2, so as to form an oil-chamber when the end of the box is packed with a leather-washer, E.

The length of the screw-nib C is made to extend within the edges of the metal box B, so that the nut F can be screwed up tightly upon the washer to keep the wheel from rattling.

To keep the nut from getting loose on the axle a groove, G, is cut lengthways of the screw-nib, into which is inserted, through holes H in the screw-nut, detent-pins J. The number of these detent-holes is eight, though a greater or lesser number may be used. Their object is, first, to detain the nut at any given point on the nib of the axle, so that it cannot be unloosed until the detent-pin is taken out of the groove; and the second and more important is to make the nut adjustable, so as to compensate for the wearing away of the washer-packings. Thus, in putting the wheel on the axle in the first instance the washer is thick and springy. After a day or two's use it grinds down, so as to let the wheel rattle. If this is not compensated for immediately, the metal box B jams and cuts the washer to pieces, and thereby destroys it.

By my invention it will be obvious that, as the washer wears away, it can be compensated for by screwing up the nut one or more holes on the nib, according to the wear of the washer, and then be secured again by the detent-pin inserted in the groove, as before. When thus set or adjusted, the wheel is kept perfectly steady in its motion, and thus prevents the washer being cut out.

With the ordinary nut, when the washer wears away, the nut is set up as tight as the wrench will draw it. Of course the first effect on running the wheel is to grind or cut the washer to pieces, because of its having been over-tightly compressed, and thus the very means resorted to to compensate the wear on the washer begets the evil designed to be overcome.

This portion of my invention, therefore, is not only important for the reason of preventing the loosening of the nut on the axle, as also for the facility with which the rattling motion of a loosely-running wheel may be overcome; but also for the economical use of washers, which, with wagons and carriages in constant use, is an item of considerable expense.

The second portion of my invention is in making the screw-nut solid-headed or box-like, that is, making the depth of the cavity in the nut a little less than the length of the screw-nib, so that, when the nut is set up to its full depth, the end of the nib bears against the bottom of the cavity, and thus obviates the formation of shoulders or bearings at the junction of the body of the axle-spindle with the screw-nib. The object of this is to prevent the nut from drawing against the end of the metal box in which the axle runs, and thereby locking the wheel and axle together to impede or prevent the wheel from rotating; also the weakening of the nib or axle-spindle, by forming shoulders for the nut to draw against, as is commonly the case, by making the screw-nib of less diameter than the body of the spindle.

Having now described my invention, I will proceed to set forth what I claim and desire to secure by Letters Patent of the United States.

1. The groove G formed in the screw-nib C, in combination with the detent-pin J and series of holes H formed in the nut F, arranged and operating in manner and form substantially as set forth.

2. The combination of the solid-headed or box-nut F with the screw-nib C of a wagon-axle, when the said nib is made of greater length than the depth of the cavity in the screw-nut, so as to make the bottom of the said cavity the bearing for the end of the nib to draw against, and thus obviate the formation of shoulders on the nib of the axle, and thereby weakening the same.

ALFRED E. SMITH.

Witnesses:
CHARLES L. BARRITT,
FRANKLIN BARRITT.